455-296 SR

FIP8106 XR 3,182,263

CROSS REFERENCE

SEARCH ROOM

INVENTOR

William H. Gossard,

BY [signature]

ATTORNEY

May 4, 1965 W. H. GOSSARD 3,182,263

DIVERSITY RECEPTION SYSTEM WITH CORRECTION FOR LONG-TERM FLUCTUATIONS IN SIGNAL STRENGTH

Filed Nov. 14, 1962 5 Sheets-Sheet 2

INVENTOR

William H. Gossard,

BY [signature]

ATTORNEY

INVENTOR
William H. Gossard,
BY
ATTORNEY

May 4, 1965 W. H. GOSSARD 3,182,263

DIVERSITY RECEPTION SYSTEM WITH CORRECTION FOR LONG-TERM FLUCTUATIONS IN SIGNAL STRENGTH

Filed Nov. 14, 1962

5 Sheets-Sheet 4

INVENTOR
William H. Gossard,

BY [signature]

ATTORNEY

INVENTOR
William H. Gossard

BY [signature]
ATTORNEY 3,182,263

DIVERSITY RECEPTION SYSTEM WITH CORRECTION FOR LONG-TERM FLUCTUATIONS IN SIGNAL STRENGTH

William Herbert Gossard, Takoma Park, Md., assignor to the United States of America as represented by the Secretary of the Army Filed Nov. 14, 1962, Ser. No. 237,775
4 Claims. (Cl. 325—370)

(Granted under Title 35, U.S. Code (1952), sec. 266)

The invention described herein may be manufactured and used by or for the Government for governmental purposes without the payment to me of any royalty thereon.

This invention relates to a diversity reception system, and more particularly to a diversity reception system which corrects for long-term fluctuations in a received signal and by which short-term fluctuations between two spaced portions of the signal cause the better one of the two signal portions to be connected to a signal receiver.

A common expedient which is employed to overcome the effects of signal fading is a diversity receiving system. Generally, such a system may include a plurality of spaced antennas which are so separated (at least one wavelength apart) that the signal varies differently at the antennas. Such a system is termed a space diversity receiving system. Other types of diversity systems include those which receive signals having different polarizations by antennas at the same location or provide antennas at different vertical angles of reception. Many diversity receiving systems may be used for these various functions, and the present system, while it also may be so used, will be described as a space diversity receiving system.

Space diversity reception systems that have been devised heretofore generally compare the variations of an RF carrier at two or more spaced antennas by means of two or more receivers. They then select or combine the better signal at an IF or AF stage of the system. While most of these prior art systems adequately connect the better one of two or more signals to the system receiver, they are deficient in at least one respect. This deficiency can be seen from the result of studies of the long-term fluctuations of the amplitude of long-range, F–2 layer-propagated, high-frqeuency communications. Such studies reveal that a given signal is subject to two types of fluctuations. The first type can be termed rapid fluctuations which occur in periods of less than a minute. The second has slower, long-term characteristics whose periods are in the order of five minutes or more. While prior art systems, for the most part, adequately account for the more-rapid-type fluctuations to which a signal is subject, none heretofore devised corrects for the long-term fluctuations.

It is an object of this invention to provide a new and improved diversity reception system.

It is another object of the invention to provide a new and improved diversity reception system which corrects for long-term fluctuations in a received signal and by which short-term fluctuations between two spaced portions of the signal determine which one of the two signal portions are to be connected to a signal receiver.

A diversity reception system illustrating certain features of the invention may include a plurality of antennas for receiving signals, a communications receiver, means for connecting one of the antennas to the receiver at any given time, means energized by the receiver output for controlling the antenna connecting means and for determining which signal is applied to the receiver, and means included in the last-mentioned means for compensating for long-term perturbations in the signal applied to the receiver.

A complete understanding of the invention may be had from the following detailed description of apparatus forming a specific embodiment thereof, when read in conjunction with the appended drawings, in which.

Figure 1:
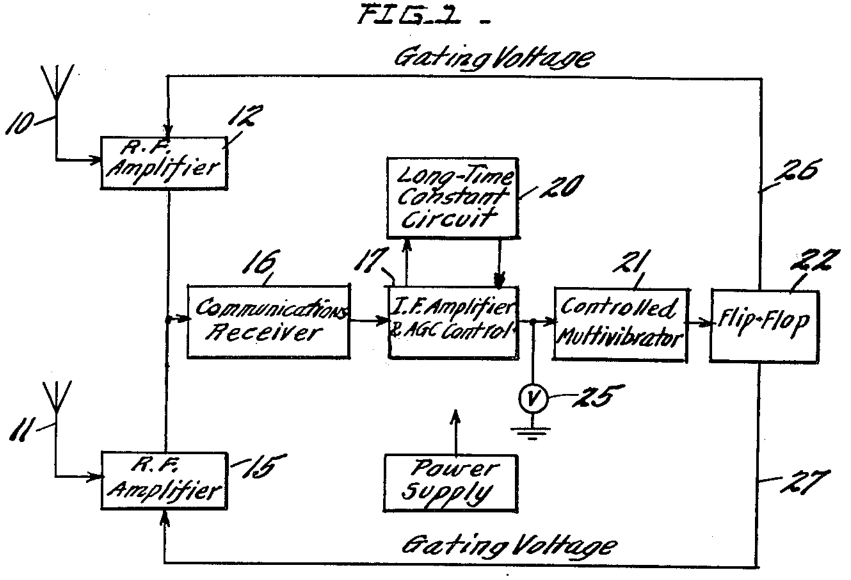
FIG. 1 is a functional diagram of a diversity receiving system embodying the invention.
Figure 3:
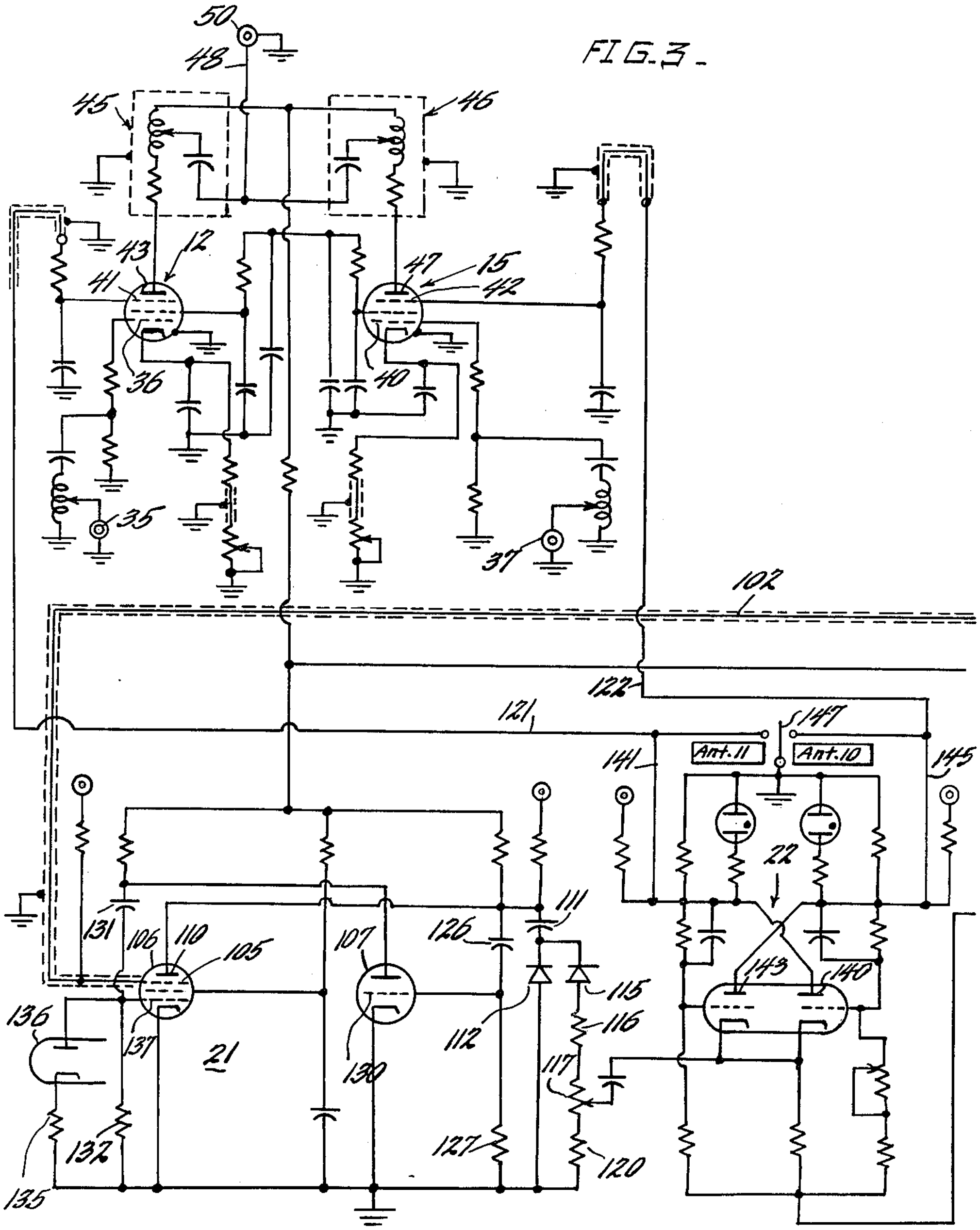
Figure 5:
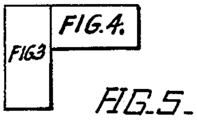
Figure 4:
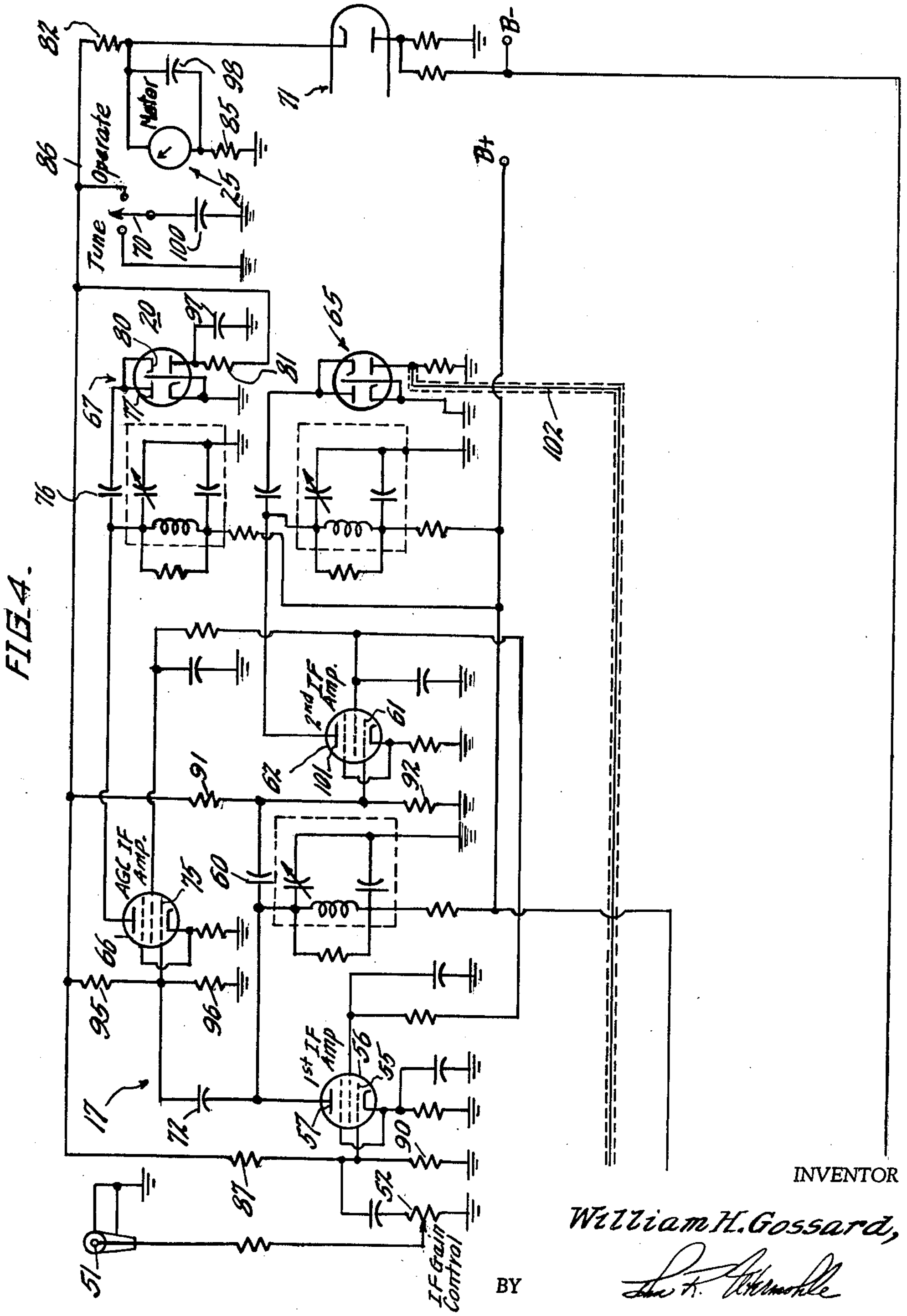
Figure 6:
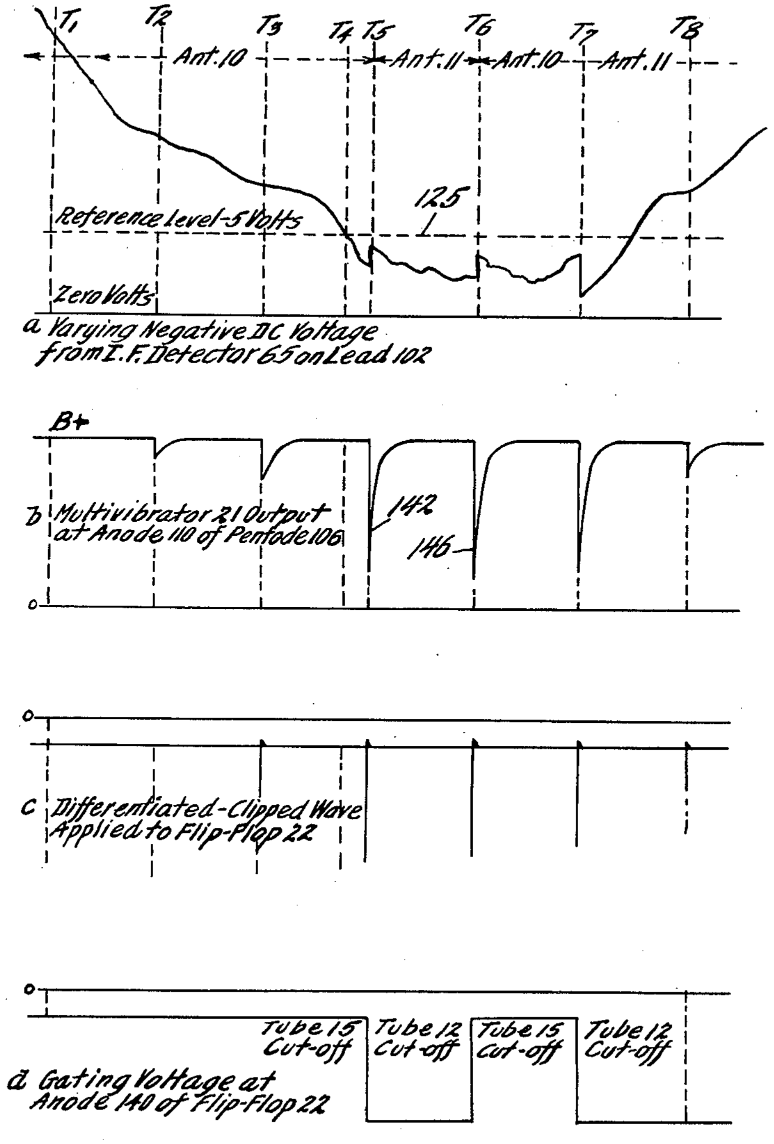
Figure 7:
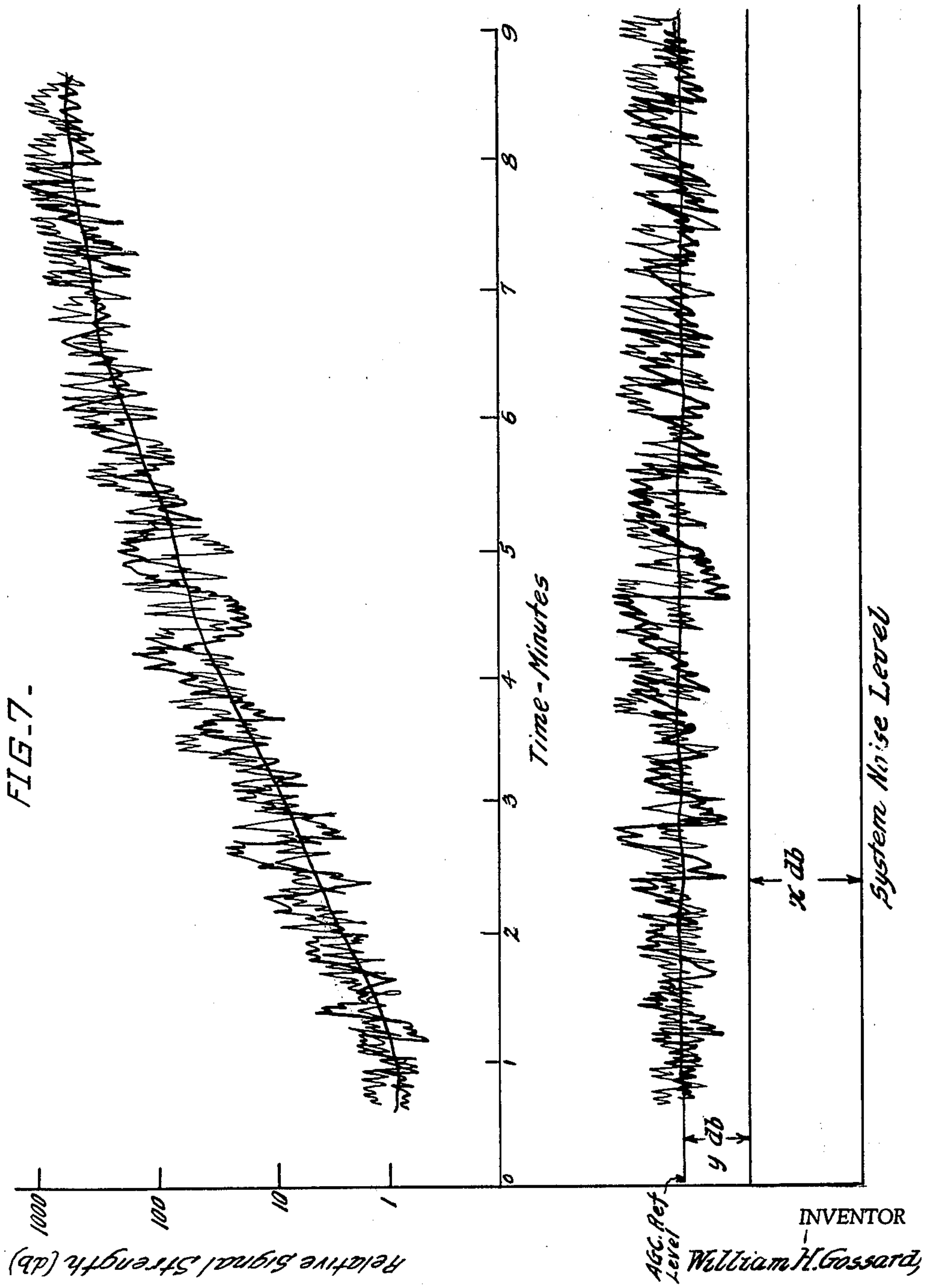

FIGS. 3 and 4, when assembled as depicted in FIG. 5, show a schematic diagram of the apparatus shown in FIG. 1;

FIG. 6 is a timing diagram showing potentials at various points in the schematic shown in FIGS. 3 and 4, and FIG. 7 shows curves that illustrate a relative strength of two different portions of a signal received by the diversity reception system shown in FIG. 1.

Referring now to the drawings, wherein like reference numerals designate similar elements in the various views, and more particularly to FIG. 1, two antennas 10 and 11 are shown functionally, and these antennas are located at two spaced points at least a wavelength apart, while a distance of 3 to 10 wavelengths is desirable if the required space is available. The antenna 10 is connected to the input of an RF amplifier 12, and the antenna 11 is connnected to a second RF amplifier 15. As will be shown, an output from only one of the RF amplifiers 12 and 15 is connected, at any given time, to the input of a communications receiver 16. The receiver 16 may be any type of receiver known to the prior art wherein heterodyning takes place to result in a comparable signal at a suitable intermediate frequency (IF).

A signal at the output of the receiver 16 is then connected to an IF amplifier and automatic gain (AGC) control circuit 17. Connected to an output of the circuit 17 is what is termed in FIG. 1 a long-time-constant circuit 20. As shown in this figure, an output from the circuit 20 is fed back into the IF amplifier and AGC circuit 17. As will be described more fully hereinbelow, this feedback arrangement will correct for long-term variations of propagation in the signal received by the system. Also, an output is taken from the circuit 17 which varies in accordance with the heretofore-described, short-term fluctuations in the signal and is applied to a multivibrator 21. As the amplitude of the signal being applied to the multivibrator 21 varies, output pulses, spaced apart by constant intervals and varying in amplitude oppositely to the amplitude of the input thereto, are applied to a flip-flop 22. If the pulses being applied to the flip-flop 22 are not of a sufficient amplitude, the flip-flop 22 will not be energized. To set this amplitude initially, since it depends upon the amplitude of the input to the multivibrator 21, a voltmeter 25 is provided to indicate the potential being applied to the multivibrator 21.

In any event, if the input to the flip-flop 22 is not sufficient to energize it, this means that the signal being received by the then-receiving antenna has at least a predetermined strength (which will be referred to hereinafter as the reference level). Should this strength decrease a predetermined amount, the input to the flip-flop 22 will be increased sufficiently to energize the flip-flop. Such energization causes pulses of square waveform to be applied alternately over two leads 26 and 27 which are connected, respectively, to the RF amplifiers 12 and 15. As designated in FIG. 1, the potentials on these leads are gating voltages, and they gate on the RF amplifiers 12 and 15 alternately until a signal of predetermined strength (i.e., above the reference level) is received by either one of the antennas 10 and 11. When this occurs, the amplitude of the input to the multivibrator 21 is sufficiently large that the output thereof decreases sufficiently to stop energization of the flip-flop 22. During the time that the flip-flop gates the RF amplifiers on alternately, the system is said to be hunting, and as soon as a signal of given strength is received by either of the antennas 10 and 11, the system stops hunting.

Figure 2:
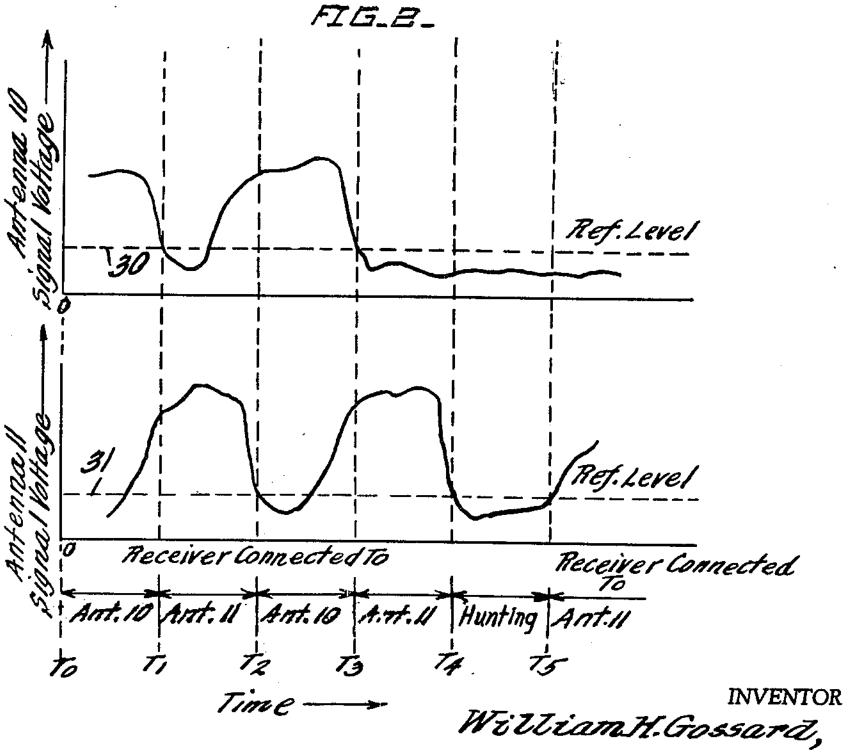
FIG. 2 illustrates a typical sequence of switching operation for the circuit shown in FIG. 1.

This can better be seen by referring to FIG. 2 which shows a typical sequence of switching operations between the two RF amplifiers 12 and 15 and, therefore, between the two antennas 10 and 11. At time $T_0$, the signal being received by the antenna 10 is above a predetermined reference level indicated by the dashed line 30, and the signal being received by the antenna 11 is below a similar such reference level which is designated by the numeral 31. At this time, therefore, the antenna 10 is connected to the receiver 16 in the system. At time $T_1$, the signal potential on the antenna 10 drops below the reference level and that of the antenna 11 is above such level. At this time, the condition of the flip-flop 22 is reversed to gate the RF amplifier 15 on so that the signal being received by the antenna 11 is connected to the receiver 16.

At time $T_2$, the relative signal levels cause the antenna 10 to be connected to the receiver 16, and at the time $T_3$, the antenna 11 is connected thereto in the manner described above. At time $T_4$, both signals are below the reference level. Therefore, as described broadly above, the flip-flop 22 will switch back and forth, i.e., hunt, between the amplifiers 12 and 15, gating them on alternately, until one of the antennas 10 and 11 has a signal level greater than the reference level. As shown in FIG. 2, this occurs at time $T_5$ when the antenna 11 is connected to the receiver 16.

Referring now to the detailed schematic diagram in FIGS. 3 and 4, a jack 35 is connected to the antenna 10 for presenting the signal on the antenna 10 to a control grid 36 of the RF amplifier 12. Similarly, a jack 37 is connected to the antenna 11 for connecting the signal thereon to a control grid 40 of the RF amplifier 15. As shown in FIG. 3, the RF amplifiers 12 and 15 are pentode amplifiers common in the art with one exception. Means are provided for gating the amplifiers 12 and 15 on and off, and such means are, as will be described more fully hereinbelow, connected to suppressor grids 41 and 42, respectively, thereof. It is sufficient to state here that the suppressor grids 41 and 42 are connected to opposite outputs of the flip-flop 22 and that, because of such connections, only one of the RF amplifiers 12 and 15 conducts at any one time. Connected to an anode 43 of the amplifier 12 is a tank circuit 45, and a tank circuit 46 is connected similarly to an anode 47 of the RF amplifier 15 so that, when either one of the amplifiers is conducting, an output is impressed through the associated tank circuit and over a lead 48 to an output jack 50.

The RF output appearing at the jack 50 is then applied to any conventional type of communications receiver which will provide, by heterodyning action, a signal at an intermediate frequency (IF), usually around 450 kc. Such a receiver is designated 16 in FIG. 1, and it is sufficient to state here that the IF output of such a receiver is applied to an IF input jack 51 shown in FIG. 4. The circuit shown in FIG. 4 includes the IF amplifier and AGC circuit 17 and the long-time-constant circuit 20 of FIG. 1. As can be seen in FIG. 4, the circuit 17 is a two stage unit which includes an automatic gain control circuit, the latter embodying a particular feature of the present invention. With respect to the IF amplifier portion of this circuit, the IF input from the receiver 16, which is applied to the jack 51, is also applied through an IF gain control potentiometer 52 to a control grid 55 of a 1st IF amplifier 56. The setting of the IF gain control potentiometer 52 adjusts the level of the input voltage to the 1st IF tube 56 for a purpose which will be described more fully hereinbelow. The output of the 1st IF amplifier 56 appears on its anode 57 and is coupled through a capacitor 60 to a control grid 61 of a 2nd IF amplifier 62. As can be seen in FIG. 4, both IF amplifiers 56 and 62 are single-tuned, and may be turnable over a frequency range of 390 to 510 kc. Also, as will be described hereinafter, the output of the 2nd IF amplifier 62 is applied to a detector circuit 65 to control the operation of the multivibrator 21 (FIGS. 1 and 3). First, however, the action of the automatic gain control (AGC) portion of the circuit 17 will be described.

The AGC portion of the circuit 17 consists of a single AGC IF amplifier 66, a detector and voltage doubler 67, a Tune-Operate switch 70, the IF lever meter circuit 25 and a meter-overload circuit 71. The signal on the anode 57 of the 1st IF amplifier 56 is fed through a coupling capacitor 72 to a control grid 75 of the AGC IF amplifier 66. The signal is amplified by the amplifier 66 and coupled through a capacitor 76 to an anode 77 of the left-hand side of the detector 67 and to a cathode 80 of the right-hand side thereof, where voltage doubling and detection occur. Resistors 81, 82 and 85 form a voltage divider, and the potential developed across the resistors 82 and 85, on a lead 86, is fed back to the control grids of the amplifiers 56, 62 and 66. More specifically, the potential on the lead 86 is applied to the control grid 55 of the 1st IF amplifier 56 through a bias divider network including resistors 87 and 90, to the control grid 61 of the 2nd IF amplifier 62 through such a network including resistors 91 and 92, and to the control grid 75 of the AGC IF amplifier 66 through a similar network including resistors 95 and 96.

The Tune-Operate switch 70 permits the selection of either a short or a long time-constant in the AGC portion of the circuit 17. In the Tune position, the rate of change of the IF reference level is determined by a shorter time-constant network composed of the resistors 81, 82 and 85 and capacitors 97 and 98. In the Operate position, the rate of change of the reference level is determined by a long time-constant network composed of the same resistors and capacitors mentioned above, with the capacitors 97 and 98 connected in parallel with a large (e.g., 150 microfarads) capacitor 100. With the Tune-Operate switch 70 in the Tune position, the IF reference level can be quickly adjusted by setting the IF gain control potentiometer 52 while observing the potential indicated on the meter 25 (FIGS. 1 and 4). When, however, the diversity selection system is in operation, the switch 70 is placed in its Operate position. In this case, the 63% charging time-constant of the longer time-constant network, including the large capacitor 100, is sufficiently long to prevent the over-all IF amplifier gain from reaching stability in a period of less than approximately five minutes. Therefore, this long time-constant circuit, in conjunction with the AGC IF amplifier 66 and its threefold feedback to the IF amplifiers 56 and 62 and to its own input, corrects for long-term fluctuations in the signal being received by the system. In one specific example, the output of the IF amplifier and AGC circuit 17 operates at a constant level of within $\pm 2$ db for input signal variations of 60 db.

In the circuit described immediately above, the system shown in FIGS. 3 and 4 corrects for long-term fluctuations in a received signal. Also, as mentioned above, the selection of one of the antennas 10 and 11 is determined by which of these antennas contains a signal which first exceeds the reference level, this selection being maintained as long as the signal on the selected antenna remains above the reference level. Also, this selection is determined by the comparably rapid fluctuations of the signals. These rapid fluctuations appear in the output of the 2nd IF amplifier 62, on an anode 101 thereof, and the signal appearing thereon is rectified by the IF detector 65 to provide a D.C. control potential. The IF detector includes a diode clamper on the left-hand side thereof and rectifier on the right-hand side. Consequently, the A.C. potential on the anode 101 of the 2nd IF amplifier 62 is rectified by the detector 65, and a varying negative D.C. control potential is applied to a lead 102 and to a suppressor grid 105 of a pentode control tube 106 (FIG. 4) in the multivibrator circuit 21.

The pentode 106 and a triode 107 are connected as a free running, unsymmetrical, plate-coupled multivibrator which may have a frequency of, for example, 500 c.p.s. As will be shown, this multivibrator can be termed a controlled multivibrator in that the varying D.C. potential which is applied over the lead 102 and to the suppressor grid 105 of the pentode 106 will cause equally-spaced (2 milliseconds apart with a frequency of 500 c.p.s. for the multivibrator 21) but varying-amplitude pulses. These pulses, on an anode 110 of the pentode 106, which is the output of the multivibrator 21, are applied through a differentiating network including a capacitor 111, diodes 112 and 115 and resistors 116, 117 and 120 to the input of the flip-flop 22. As will be shown in detail hereinbelow, if the amplitude of these pulses is sufficiently high, the flip-flop 22 will be energized.

Since oppositely disposed outputs from the flip-flop 22 are applied to leads 121 and 122 which are connected, respectively, to the suppressor grids of the RF amplifiers 12 and 15, the amplifiers 12 and 15 will be gated on alternately. It was mentioned above that these gating potentials are applied to the suppressor grids of the RF amplifiers in two cases. First, when one of the antennas 10 and 11 has a suficiently strong signal thereon, the RF amplifier associated with this antenna is gated on as long as such signal strength is maintained. Secondly, if neither of the antennas is receiving a sufficiently strong signal, the RF amplifiers 12 and 15 are gated on alternately (in accordance with the frequency of the multivibrator 21) so that the system "hunts" until a sufficiently strong signal is received by either of the antennas. The specific circuitry provided to result in this control of the antennas 10 and 11 by the rapid fluctuations in the signal will now be described.

Referring now to the multivibrator 21 and the flip-flop 22 of FIG. 3 and the waveforms shown in FIG. 6, the waveform shown in FIG. 6*a* represents the varying negative D.C. potential which is derived from the IF detector 65 and which is applied over the lead 102 to the suppressor grid 105 of the multivibrator control pentode 106. A reference level of a predetermined potential (e.g., —5 volts) is designated by a dashed line 125, and this reference level is set by the IF gain control potentiometer 52 in the control grid circuit (FIG. 4) of the 1st IF amplifier 56. Also, it will be assumed that the varying negative potential shown in FIG. 6*a* results from the antenna 10 being connected to the system, i.e., the associated RF amplifier 12 is gated on. Consequently, the signal shown existing at the time $T_1$ in FIG. 6 is sufficiently strong so that the amplitude of the IF detector 65 output is of sufficient negative amplitude to prevent the controlled multivibrator 21 from vibrating. At time $T_2$, the signal amplitude on the antenna 10 has decreased sufficiently to permit the multivibrator control tube 106 to conduct slightly, thereby decreasing the potential of the anode 110 thereof. This anode potential is shown in FIG. 6*b* at the time $T_2$, and as the potential on the suppressor grid 105 of the pentode 106 becomes less negative (FIG. 6*a*), the anode potential thereof decreases, and this decreased potential is coupled through a differentiating circuit including a capacitor 126 and a resistor 127 to a control grid 130 of the triode 107. This differentiated, negative pulse is sufficient to render the triode 107 nonconductive. When the triode 107 ceases to conduct, its anode potential rises, and this rise in potential is differentiated by a capacitor 131 and resistors 132 and 135 (the resistor 135 is included since a diode 136 conducts when a positive pulse appears on its anode) and is applied to a control grid 137 of the pentode 106. After a predetermined time, when the negative pulse which cut off the triode 107 has decayed sufficiently, the triode will again conduct, and its anode potential will decrease. This decrease in anode potential of the triode 107 is coupled to the control grid 137 of the pentode 106 through the differentiating circuit which now includes only the capacitor 131 and the resistor 132, the resistor 135 not being included since the diode 136 does not conduct when a negative pulse appears on its anode. The time-constant of this latter differentiating network is sufficiently long to hold a negative potential on the control grid 137 of the pentode 106 which serves to keep this tube cut off. Consequently, although the multivibrator has operated for one cycle, the output pulse level is of insufficient amplitude to energize the flip-flop 22. This negative pulse of insufficient amplitude is shown in FIG. 6*b* at time $T_2$.

At time $T_3$, the signal voltage on the antenna 10 has decreased more, and the multivibrator 21 repeats its cycle as described above. Since, in this case, the D.C. control voltage on the lead 102 and being applied to the suppressor grid 105 of the pentode 106 is even less negative at time $T_3$ than it was at time $T_2$, the pentode 106 conducts more heavily. As a result, the potential of the anode 110 of the pentode 106 shown in FIG. 6*b* at time $T_3$ is greater than that shown at time $T_2$, but it is still insufficient to actuate the flip-flop 22. Then, referring to FIG. 6*a*, the poential appearing on the lead 102 and the suppressor grid 105 reaches the reference level of —5 volts at time $T_4$. However, due to the period of the multivibrator cycle, no action takes place until time $T_5$.

At time $T_5$, the signal on the antenna 10 is still below the reference level, and the output of the IF detector tube 65 is less negative than the reference level of —5 volts. With a control voltage of —5 volts or less applied to the lead 102 and to the suppressor grid 105 of the pentode 106, the differentiated multivibrator output appearing on the anode 110 of the pentode 106 is sufficient to actuate the flip-flop 22. This pulse of sufficiently negative amplitude is shown at time $T_5$ in FIG. 6*b*. As stated above, it has been assumed that from time $T_1$ to time $T_5$, the antenna 10 was connected to the system since the RF amplifier 12 was gated on. This amplifier was gated on since a positive potential was appearing on its suppressor grid 41 as a result of the right-hand side of the flip-flop 22 being nonconductive in this time interval. When the right-hand side of the flip-flop 22 is cut off, the potential of a right-hand anode 140 thereof is at some relatively high value (for example, —9 volts) which is applied over a lead 141 and the lead 121 to the suppressor grid 41 of the RF amplifier 12. At time $T_5$, when the multivibrator output pulse (designated 142 in FIG. 6*b*) is applied to the input of the flip-flop 22, the right-hand side thereof is rendered conductive, and the left-hand side is cut off. At this time, the potential of the anode 140 of the conducting right-hand side of the flip-flop 22 decreases, and a more negative potential (for example, —73 volts) is applied to the suppressor grid 41 of the RF amplifier 12, thereby cutting off this amplifier. Simultaneously, the left-hand side of the flip-flop 22 is cut off, the potential of its anode 143 rises, and a relatively high potential (e.g., —9 volts) is applied over a lead 145 and the lead 122 to the suppressor grid 42 of the RF amplifier 15, rendering the tube conductive. Consequently, at time $T_5$, the output of the antenna 11 is applied through the conducting RF amplifier 15 to the system. For this reason, FIG. 6*a* shows that the antenna 11 is connected to the system between times $T_5$ and $T_6$.

It will be noted from FIG. 6*a* that the signal on the antenna 11 is sufficiently low to cause the output of the IF detector 65 to be below the reference level of —5 volts during the time that it is connected to the system, that is, beween the times $T_5$ and $T_6$. At time $T_6$, the signal on the antenna 11 is still below the reference level, and the flip-flop 22 is actuated again as described hereinabove since a pulse (designated 146 in FIG. 6*b*) of sufficient amplitude is applied thereto at this time. As a result, the RF amplifier 12 is again rendered conductive to connect the antenna 10 to the system, and the RF amplifier 15 is cut off. Since the signal on the antenna 10 is still below the reference level between the times $T_6$ and $T_7$, at time $T_7$, the antenna 11 will again be connected to the system. Referring to FIG. 6a between the times $T_7$ and $T_8$, it will be noted that the signal on the antenna 11 rises above the reference level. As described above, when a signal of this strength appears on the lead 102 and is applied to the suppressor grid 105 of the multivibrator control pentode 21, the differentiated multivibrator output is not sufficient to actuate the flip-flop 22. Consequently, antenna 11 will remain connected to the system after time $T_8$ and until the signal strength thereon causes the potential on the lead 102 to rise above the reference level. Since, as is mentioned above, the period of the multivibrator may be in the neighborhood of 2 milliseconds, it is possible for very rapid fades of a duration less than 2 milliseconds to occur without the antennas being automatically switched.

The flip-flop 22 may be any one of many known in the art, and this type of flip-flop is actuated when a sharp negative pulse is received at the input thereof. As mentioned above, the output of the multivibrator 21 appears at the anode 110 of the control pentode 106, and a typical representation of this output is shown in FIG. 6*b*. This output is differentiated by a network composed of the capacitor 111, the diodes 112 and 115, and the resistors 116, 117 and 120. This network differentiates the wave form shown in FIG. 6*b*, clips the positive pulses at ground potential, and provides a flip-flop threshold adjustment. The resulting output from this network is shown in FIG. 6*c*. When the amplitude of the resultant negative pulse is sufficient, the flip-flop 22 is actuated. This is shown in FIG. 6*d*, and, as described above, it occurs at times $T_5$, $T_6$ and $T_7$. The wave form shown in FIG. 6*d* represents the potential on the anode 140 of the right-hand side of the flip-flop 22 which is applied over the leads 141 and 121 to the suppressor grid 41 of the RF amplifier 12.

As stated previously, the diversity reception system of the present invention corrects for long-term fluctuations in the signal that result from slow changes to the F–2 layer of the atmosphere. As described, the long-time constant circuit including the capacitor 100 and the threefold feedback thereof causes such correction, so that the present system operates at a constant level within, for example, ±2 db for input signal variations of 60 db. This is graphically illustrated in FIG. 7. The upper wave form shown therein illustrates the results of the slowly changing F–2 layer on a signal. Two signals are shown in this figure (one by a heavy line and the other by a light line) to illustrate the signals being received by the antennas 10 and 11. The long-time-constant circuit and the AGC circuit correct for the long-term variations in the signal to result in an effective signal shown in the lower wave form of FIG. 7, wherein the average signal value varies within ±2 db. The rapid fluctuations in the signals cause the system to switch between the two antennas 10 and 11, depending upon which has a signal applied thereto greater than the reference level. Also, the reference level, as set by the IF gain control potentiometer 52, is shown in the lower wave form as being set $x$ db above the system noise level (wherein $x$ may be between 0 and 10 db), and the AGC reference level is shown to be $y$ db above the IF reference level. (The AGC circuit may be designed so that $y$ is any value between 0 and 6.)

Referring to FIG. 3, an antenna switch 147 is shown in the anode circuits of the flip-flop 22. This switch is used in conjunction with the meter circuit 25 (FIG. 4) when the equipment is searching for a signal or when setting the IF gain control potentiometer 52 after a signal has been located, as described above. This switch serves to ground the anode of either side of the flip-flop 22 and the suppressor grid of its associated RF amplifier. This permits the operator to select either the antenna 10 or the antenna 11, independently of their signal levels, when it is desired to disable the automatic diversity switching feature of the equipment.

It is to be understood that the above arrangement of circuit elements is simply illustrative of an application of the principles of the invention, and any other modifications may be made without departing from the invention.

What is claimed is:

1. A diversity antenna system which corrects for long-term perturbations in a signal and in which short-term perturbations that occur in the signal at two different locations cause the signal at the location at which it is stronger to be applied to a signal receiver, which comprises a pair of antennas for intercepting the signal at the two locations, means for connecting a predetermined one of the antennas to the signal receiver at any given time, amplifier means energized by an output from the receiver for amplifying the signals being received by the antennas, a long-time-constant circuit included in this amplifier means for preventing the amplifier gain from reaching full stability within a predetermined period of time in order to compensate for long-term perturbations in the signal being applied to the receiver, a bistable circuit, means for alternately energizing the bi-stable circuit by an output of the amplifier whenever such output falls to a predetermined low level as a result of a decreased signal being received by the antenna connected to the receiver, and means for connecting the bistable circuit to the antenna-connecting means such that the antenna-connecting means alternately connects the antennas to the signal receiver until such time that the amplifier output rises to a sufficient level, at which time the alternate energization of the bistable means is suspended.

2. A diversity antenna system which comprises a plurality of antennas for receiving signals, a communications receiver, and means for connecting one of the antennas to the receiver at any given time, the last-mentioned means comprising an RF amplifier associated with each antenna such that the rendering conductive of the RF amplifier conveys the signal being received by the associated antenna to the receiver, an IF amplifier, means for withdrawing a signal from the receiver, representative of the input signal to the receiver but at an IF frequency, and for applying it to the IF amplifier, a capacitor in circuit connection with the IF amplifier and having a sufficiently long charging-time-constant such that the gain of the amplifier is prevented from reaching full stability within a predetermined period of time in order to compensate for long-term perturbations in the signal being applied through the RF amplifier to the receiver, and means for connecting an output from the IF amplifier to the RF amplifiers for controlling the conduction of the RF amplifiers in accordance with the quality of the signal being applied to the receiver.

3. A diversity antenna system which comprises a plurality of antennas for receiving signals, a receiver including means for providing an intermediate frequency (IF) signal which corresponds to the signal being received thereby, means for connecting one of the antennas to the receiver at any given time, an IF amplifier and automatic gain control circuit which includes a plurality of IF amplifiers having inputs and outputs, a voltage detector and an RC circuit having a long charging-time-constant, means for connecting the IF signal from the receiver to the inputs of the IF amplifiers, means for connecting an output from one of the IF amplifiers through the detector and the RC circuit to the inputs of all IF amplifiers, the charging-time-constant of the RC circuit being sufficiently long to prevent the IF amplifiers from reaching full stability within a predetermined period of time in order to compensate for long-term perturbations in the signal being applied to the receiver, and means energized by another of the IF amplifier outputs for actuating the antenna-connecting means.

4. A diversity antenna system which comprises a plurality of antennas for intercepting signals; a receiver for utilizing the intercepted signals and including means for providing a signal at an intermediate frequency (IF) which corresponds to the signal being received thereby; means for connecting one of the antennas to the receiver at any given time; an IF amplifier and automatic gain control circuit which includes three IF amplifiers having inputs and outputs, a pair of detectors, an RC circuit which has a long charging-time-constant and a plurality of feed-back circuits; means for applying the IF signal from the receiver to the input of a first of the IF amplifiers; means for applying the output of the first IF amplifier to the inputs of the second and third IF amplifiers; means for applying the output of the second IF amplifier to one of the detectors and, after detecting, to the RC circuit; means for connecting the RC circuit, by the feedback circuits, to the inputs of all of the IF amplifiers, the RC circuit having a sufficiently long charging-time-constant to prevent the IF amplifiers from reaching full stability within a predetermined period of time in order to compensate for long-term perturbations in the signal being applied to the receiver; means for applying the output of the third IF amplifier to the second detector;

a flip-flop circuit; means for connecting the detected output of the third IF amplifier to the flip-flop circuit for energizing the flip-flop circuit each time such detected output falls to a predetermined low level; and means energized by the flip-flop circuit for actuating the antenna-connecting means such that the short-term perturbations that occur in the signal cause the antennas to be connected sequentially and individually to the receiver until such time that an antenna intercepting a signal of predetermined strength is connected to the receiver.

References Cited by the Examiner

UNITED STATES PATENTS

| | | | |
|---|---|---|---|
| 2,447,057 | 8/48 | Crosby | 325—384 X |
| 2,504,348 | 4/50 | Peterson | 325—301 |
| 2,553,271 | 5/51 | Peterson | 325—304 |
| 2,872,568 | 2/59 | Provaz | 325—370 |
| 2,904,677 | 9/59 | Heidester | 325—370 |
| 2,937,268 | 5/60 | Downie et al. | 325—370 X |
| 3,037,114 | 5/62 | Bier et al. | 325—370 |

DAVID G. REDINBAUGH, *Primary Examiner.*